No. 752,883. PATENTED FEB. 23, 1904.
A. T. BROWN.
TYPE WRITING MACHINE.
APPLICATION FILED OCT. 16, 1902.
NO MODEL. 2 SHEETS—SHEET 1.
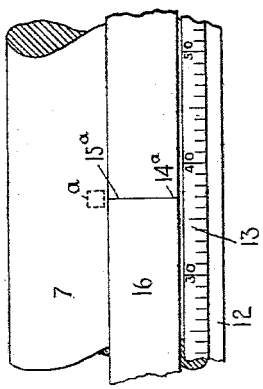
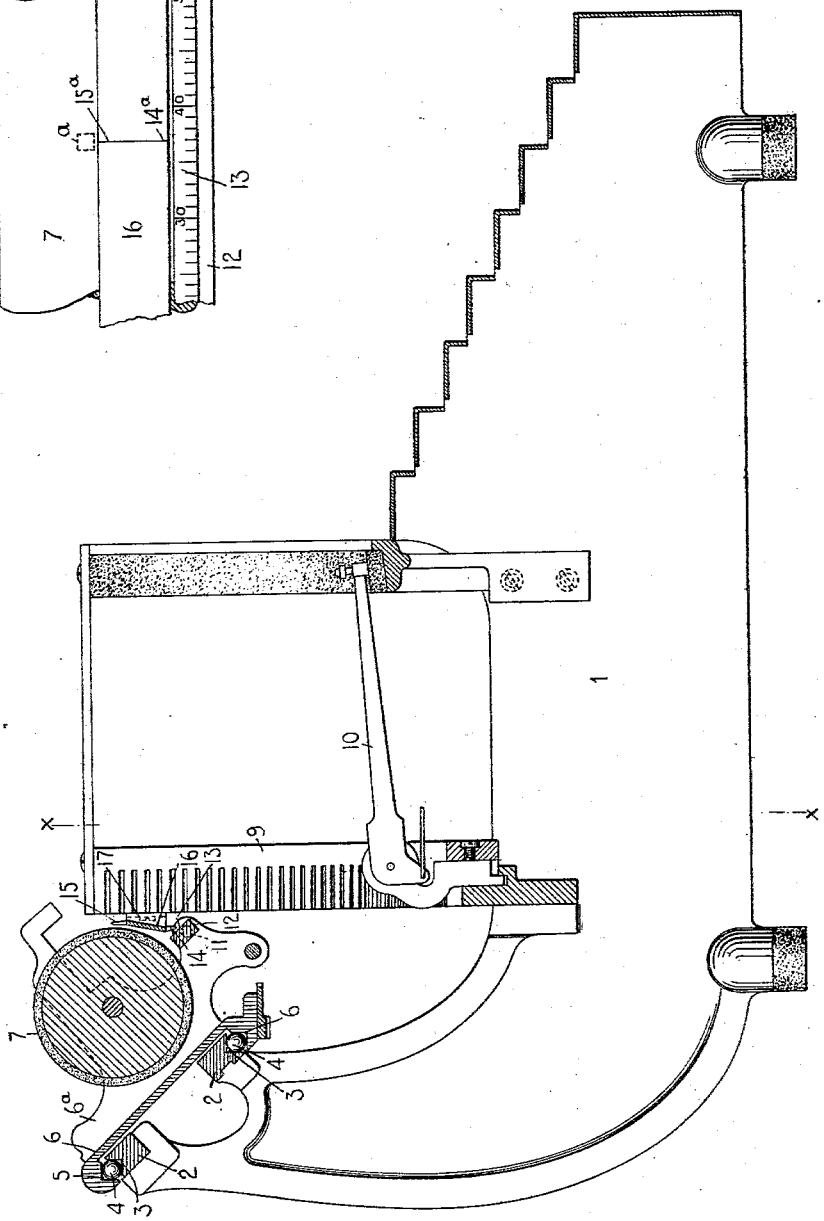
WITNESSES:
K. V. Donovan
Charles E. Smith
INVENTOR:
Alexander T. Brown
by James Felbel
HIS ATTORNEY

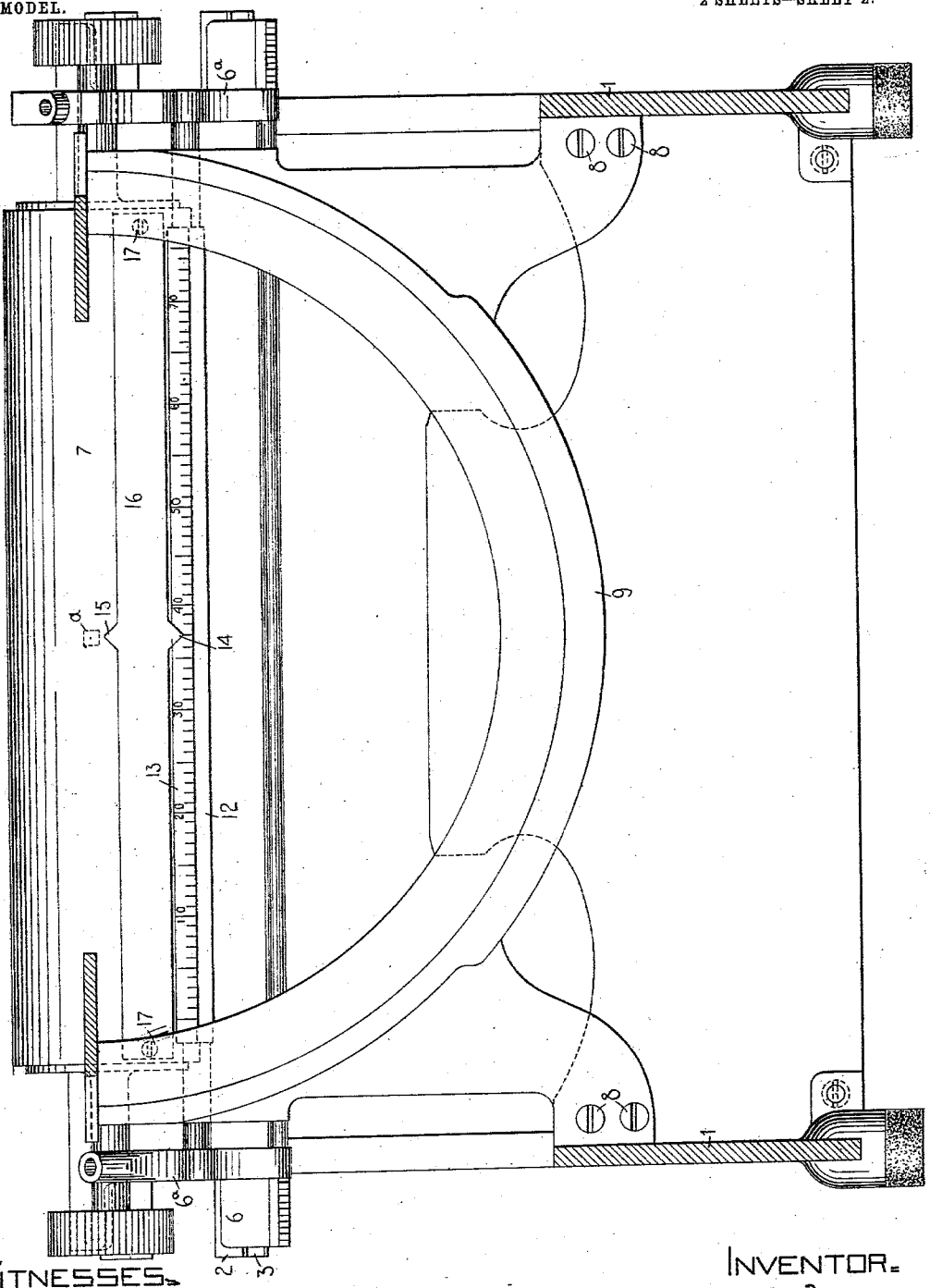

No. 752,883. Patented February 23, 1904.

UNITED STATES PATENT OFFICE.

ALEXANDER T. BROWN, OF SYRACUSE, NEW YORK.

TYPE-WRITING MACHINE.

SPECIFICATION forming part of Letters Patent No. 752,883, dated February 23, 1904.

Application filed October 16, 1902. Serial No. 127,541. (No model.)

*To all whom it may concern:*

Be it known that I, ALEXANDER T. BROWN, a citizen of the United States, and a resident of Syracuse, in the county of Onondaga and State of New York, have invented certain new and useful Improvements in Type-Writing Machines, of which the following is a specification.

My invention relates to scales and pointers for type-writing machines, the object of the invention being to provide simple and efficient devices of the character described which will correctly indicate at a glance in the general direction of the printing-point the exact position of the printing-point and also the position of the carriage with reference thereto.

To the above and other ends, which will hereinafter appear, my invention consists in the features of construction, arrangements of parts, and combinations of elements to be hereinafter described, and particularly pointed out in the appended claims.

In the accompanying drawings, Figure 1 is a front to rear vertical sectional view of one form of type-writing machine, showing my scale and pointer devices applied thereto. Fig. 2 is a transverse vertical sectional view of the same, taken on the line $x$ $x$ of Fig. 1, but with certain parts omitted. Fig. 3 is a fragmentary front elevation of a modification.

1 represents the side plates of the machine, which support cross-rails 2, which are provided with oppositely-grooved faces 3 for the reception of antifriction-balls 4, that are likewise received in the grooved raceways 5 of a carriage 6, having a platen 7. This carriage may be connected in any suitable manner with an escapement mechanism to afford the usual step-by-step feed movement thereof.

Secured to the side plates of the machine by screws 8 is a vertically-disposed type-bar segment 9, in which the type-bars 10 are mounted. The various type-bars are adapted to strike upwardly and rearwardly, the types impinging at a common printing-center or printing-point, (indicated in Fig. 2 at $a$.)

In the end bars or plates $6^a$ of the carriage is supported the ends 11 of a scale-bar 12, which on the inclined face thereof is provided with a scale 13, that is graduated or divided in accordance with the letter-space movements of the carriage and which extends throughout the length of the platen. The position of this scale is such that it is within the view of the operator at all times notwithstanding the fact that it is located beneath the printing-line and at an appreciable distance therefrom. Coöperating with this scale is a pointer, finger, or index 14. A second pointer, finger, or index 15 projects or lies adjacent to and indicates the printing-point. These devices 14 and 15 project in opposite directions, the one, 15, projecting upwardly to the printing-point and the other, 14, projecting downwardly into register with the scale, and, if desired, the terminals may be bent slightly in opposite directions, as indicated in Fig. 1. The two indexes 14 and 15 are preferably formed on a cross bar or support 16, which extends from side to side of the segment intermediate the scale and printing-line and is secured by screws 17 to the rear face or side of the segment, so the devices 14 and 15 are carried by a fixed portion of the machine, whereas the scale travels with the carriage. The upper edge of this cross-bar 16 is horizontally disposed and is just beneath and parallel with the printing-line in order that the operator may readily determine when the paper is properly positioned or "squared" on the platen with reference to the printing-line in making insertions or corrections. From an inspection of Fig. 1 it will be seen that the cross-bar 16 is set at a slight inclination, the lower edge thereof being set farther back than the upper edge in order that it will not obscure the operator's view of the scale.

From the foregoing description it will be understood that the double pointer 14 15 is fixed and is at all times in register with the printing-point and with the appropriate index on the rack and is at all times within the view of the operator and does not cross the printing-line, so as to obstruct the view of the writing, and the latter can determine at a glance toward the printing-point the position of the printing-point, as indicated by the index 15, and the relative position of the carriage to the printing-point, as indicated by the index 14 in its coöperation with the scale.

At Fig. 3 I have shown the indicating devices on the bar or blade 16 in the form of a continuous line, the upper portion 15ª of which line serves as an index for the printing-point and the lower portion, 14ª, as an index for the scale.

While I have shown my invention in only two forms, it is susceptible of further modification without departure from the spirit thereof.

The term "index" in the claims is employed in a generic sense to include pointers, projections, lines, or other indicating devices. The term "pointer" is used specifically to designate a projecting index—such, for example, as shown at Fig. 2.

From certain aspects of the invention the devices may be applied to other characters of type-writing machines than that shown and particularly to other characters of "visible" writing-machines.

Certain features herein shown and described are not claimed in this application, but constitute the subject-matter of separate applications filed by me simultaneously herewith and bearing Serial Nos. 127,536, 127,537, 127,538, 127,539, and 127,540, and also application Serial No. 161,262, filed June 13, 1903, which is a divisional application of case Serial No. 127,540, above referred to.

What I claim as new, and desire to secure by Letters Patent, is—

1. In a visible type-writing machine, the combination of a carriage, a platen carried thereby, a scale carried by the carriage, and a fixed index that at all times registers with the printing-point and with the scale.

2. In a type-writing machine, the combination of a carriage, a platen carried thereby, a scale that is located extraneous to the printing-line, and an index that does not cross the printing-line and at all times registers with the scale and with the printing-point, the index and scale being carried one by the carriage and the other by a fixed portion of the machine.

3. In a type-writing machine, the combination of a carriage, a platen carried thereby, a scale that is located extraneous to the printing-line, and an index that does not cross the printing-line and extends in one direction toward the printing-point and in an opposite direction toward the scale and at all times registers with said printing-point and scale, the index and scale being carried one by the carriage and the other by a fixed portion of the machine.

4. In a "visible" type-writing machine, the combination of a carriage, a platen carried thereby, a scale carried by the carriage at a point extraneous to the printing-line, and a double fixed pointer that extends in opposite directions and does not cross the printing-line, one index-finger terminating at the printing-point and the other at a corresponding point on the scale, said pointer being at all times in register with the printing-point and scale.

5. In a front-strike type-writing machine, the combination of a carriage, a platen carried thereby, a scale that extends throughout the length of the platen and is carried by the carriage below the printing-line and away therefrom, a fixed bar that extends across the machine intermediate of the scale and the printing-line, and a fixed index on the bar, said index at all times registering with the printing-point and with a corresponding division on the scale.

6. In a front-strike type-writing machine, the combination of a carriage, a platen carried thereby, a scale that extends throughout the length of the platen and is carried by the carriage below the printing-line and away therefrom, a fixed bar that extends across the machine intermediate of the scale and printing-line, and a double-ended pointer which is fixed to and extends away from the bar in opposite directions and is at all times in view of the operator, one end of said pointer at all times registering with the printing-point and the other at all times registering with a corresponding division on the scale.

7. In a front-strike type-writing machine, the combination of a vertically-disposed type-bar segment, a carriage, a platen, a scale that extends throughout the length of the platen and is carried by the carriage below the printing-line and away therefrom, a fixed bar that extends horizontally across the machine intermediate of the scale and printing-line and is secured to the type-bar segment, and a vertically-disposed index which extends into register with the printing-point and with a point on the scale, whereby the printing-point and the point on the scale which indicates the position of the carriage with reference to the printing-point are both in sight of the operator and are indicated by said index.

8. In a front-strike type-writing machine, the combination of a vertically-disposed type-bar segment, a carriage, a platen, a scale that extends throughout the length of the platen and is carried by the carriage below the printing-line and away therefrom, a fixed bar that extends horizontally across the machine intermediate of the scale and printing-line and is secured to the type-bar segment, and projections, one of which extends upwardly and into register with the printing-point and the other of which extends downwardly and into register with a point on the scale, whereby the printing-point and the point on the scale which indicates the position of the carriage with reference to the printing-point are both in sight of the operator and are indicated by said projections.

9. In a front-strike type-writing machine, the combination of a carriage, a platen carried thereby, a scale that is carried by the carriage below the printing-line but which is at all times within the view of the operator, a cross-bar that extends across the machine and is rigidly secured to a fixed portion thereof, and the upper edge of which is at all times beneath and adjacent to the printing-line, and a pointer that extends from said bar and is at all times in register with the printing-point and with the scale.

10. In a front-strike type-writing machine, the combination of a carriage, a platen, a scale that is carried by the carriage below the printing-line but which is at all times within the view of the operator, a cross-bar that extends across the machine between the printing-line and scale and is rigidly secured to a fixed portion of the machine and the upper edge of which bar is beneath and adjacent to the printing-line, and an index that registers with the printing-point and with the scale, whereby the printing-point and the point on the scale which indicates the position of the carriage with reference to the printing-point are both in sight of the operator, and are at all times indicated by said index.

11. In a front-strike type-writing machine, the combination of a carriage, a platen, a scale that is carried by the carriage below the printing-line but which is at all times within the view of the operator, a cross-bar that extends across the machine between the printing-line and scale and which is rigidly secured to a fixed portion of the machine and the upper edge of which bar is beneath and adjacent to the printing-line, and a rigid double-ended pointer that extends from said bar, one end extending upwardly and all times in register with the printing-point and the other extending downwardly and at all times in register with the scale, whereby the printing-point and the point on the scale which indicates the position of the carriage with reference to the printing-point are both at all times in sight of the operator, and are at all times indicated by said double-ended pointer.

Signed at Syracuse, in the county of Onondaga and State of New York, this 2d day of October, A. D. 1902.

ALEXANDER T. BROWN.

Witnesses:
 CHARLES J. TONER,
 F. G. BODELL.